United States Patent [19]

Greenleigh et al.

[11] Patent Number: 5,695,642
[45] Date of Patent: Dec. 9, 1997

[54] METHOD FOR PURIFYING CONTAMINATED WATER

[76] Inventors: Stephen H. Greenleigh, 11217 Empire La., Rockville, Md. 20850; James W. Chester, 92 Rice St., Trucksville, Pa. 18708; Peter L. Rozelle, 21 Dana St., Forty Fort, Pa. 18704; Matthew D. Dewees, 100 Goodleigh Rd., Dallas, Pa. 18612

[21] Appl. No.: 515,222

[22] Filed: Aug. 15, 1995

[51] Int. Cl.⁶ .................................................. C02F 9/00
[52] U.S. Cl. .......................... 210/638; 210/639; 210/665; 210/669; 210/682; 210/688; 210/694
[58] Field of Search ........................... 210/638, 639, 210/651, 665, 669, 682, 688, 694

[56] References Cited

U.S. PATENT DOCUMENTS

| | | | |
|---|---|---|---|
| H1227 | 9/1993 | Lewis et al. | 252/628 |
| 3,773,177 | 11/1973 | Queiser et al. | 210/68 |
| 3,870,033 | 3/1975 | Paylor et al. | 210/669 |
| 3,962,078 | 6/1976 | Hirs | 210/27 |
| 4,087,375 | 5/1978 | Tanno | 252/301.1 W |
| 4,166,032 | 8/1979 | Hanway, Jr. et al. | 210/32 |
| 4,189,381 | 2/1980 | Laferty et al. | 210/28 |
| 4,342,650 | 8/1982 | Erickson et al. | 210/606 |
| 5,221,480 | 6/1993 | Schultheis et al. | 210/638 |
| 5,238,663 | 8/1993 | Vikari et al. | 423/139 |
| 5,366,634 | 11/1994 | Vijayan et al. | 210/638 |
| 5,370,827 | 12/1994 | Grant et al. | 588/18 |

OTHER PUBLICATIONS

"A New Hybrid Inorganic Sorbent For Heavy Metals Removal" by Yi–Min Gao, Arup K. Sengupta and Dale Simpson, Wat. Res. vol. 29, No. 9, pp. 2195–2205.

"Selective Sorption of Heavy Metals Using an Iron–Rich Waste Byproduct" by Anand Ramesh, A Thesis Presented to the Graduate Committee at Lehigh University in Candidacy for the Degree of Master of Science in Civil Engineering, Lehigh University, Oct. 1992.

*Primary Examiner*—Ivars Cintins

[57] ABSTRACT

A method and apparatus for purifying contaminated water includes four subsystems for removing undissolved solids, precipitation and flocculation of dissolved solids, polishing or cation removal of dissolved solids, and metallurgical furnace treatment of the separated contaminants along with gas cleaning. A unique high density inorganic adsorbent, produced during the reducing atmosphere Waelz Kiln processing of iron, zinc, lead and cadmium rich Electric Arc Furnace dust, is used to raise the pH level of the contaminated water in the precipitation procedure and again as an adsorbent filter bed in a clear well extraction vessel used in the polishing step.

9 Claims, 4 Drawing Sheets

METHOD FOR PURIFYING CONTAMINATED WATER

BACKGROUND OF THE INVENTION

1. Technical Field

The present invention pertains generally to the purification of water contaminated by hazardous material and more particularly to the removal, recovery and processing of aqueous based metals and/or radioactive materials from waste waters.

2. Discussion of the Prior Art

Water contaminated with radioactive and non-radioactive metals poses an increasing threat to health and the ecology as the use of nuclear power proliferates. Sources of such surface and subsurface aqueous contamination include the drainage, impoundment and landfills at metal and radioactive material mining and processing sites, sludges produced by steel mills, reactor cooling systems, and the remediation operations used in the storage and disposal of spent nuclear fuel and the recovery of previously contaminated land sites.

Prior art treatment processes to remove undissolved solids include the use of settling tanks, clarifiers, centrifuges, gravity filters and pressure filters. The processed effluent, freed of undissolved solids by methods or combination of methods using such apparatus, is then further processed to remove dissolved solids, again applying one or more conventional procedures, including precipitation initiated by pH adjustment or reagent addition, flocculation and settling, microfiltration and precipitate concentration through centrifuge or plate press action.

Filter material, depending on the process employed and material removed, can be perforated or slotted metal, or polypropylene or polyester cartridges. High density inorganic adsorbent materials (HDIA) can be used to promote solid separation in the flocculation phase. Typically, these materials have been natural or synthetic low density aluminum silicates called zeolites, used to capture positively charged ions of the filtered elements.

Beds of sand or other particulate matter are used in a mechanical filtration process called polishing. The contaminated water is passed one or more times through the bed with or without periodic backwashes to flush the entrapped residue upstream for flocculation and microfiltration. In a recent stand-alone application, an iron-rich HDIA material has been used as the particulate bed and proved effective in a clear-well apparatus to achieve both filtration and ionic capture of dissolved metals.

These known procedures and techniques for separating and removing aqueous based contaminants greatly reduce the environmental hazards. Unfortunately, however, a high degree of desired effluent purity may require repeated cycling through the individual filtration steps with associated storage, time and cost penalties, if such a high level can be achieved at all, and the collected solid concentrate and associated gases pose a continuing environmental problem.

SUMMARY OF THE INVENTION

Accordingly, it is a primary object of the present invention to purify water contaminated with dissolved and solid radioactive or nonradioactive metal materials.

It is a further object of the present invention to purify a wide range of contaminated feedstock water to an environmentally benign level.

It is another object of the present invention to render removed and separated contaminating materials in a readily processable form for storage or reclamation.

It is yet another object of the present invention to improve the efficiency of the precipitation and removal of dissolved solids from contaminated water.

It is still a further object of the present invention to integrate a metallurgical furnace into a water purification process for pyrometallurgical conversion of recovered materials.

Another object of the present invention is to reduce the time and cost of transforming water contaminated with metal and radioactive material into environmentally benign water and easily useable or storable recovered concentrate.

The aforesaid objects can be achieved individually and in combination and it is not intended that the invention be construed as requiring that two or more of said objects be combined.

In accordance with the present invention, a method for purifying contaminated water involves sequentially removing undissolved solids using one or more conventional separation techniques, precipitating and removing a large proportion of dissolved solids using one or more conventional separation procedures combined with adsorption treatment with a powdered form of a unique ferrous zeolite high density inorganic adsorbent material to selectively and controllably remove target metal ions, a polishing procedure whereby the processed effluent is filtered upward through an extraction bed of crushed inorganic microporous ferrous HDIA material, and direct processing of separated contaminants through a metallurgical furnace equipped with a gas cleaning apparatus for conversion into processable or easily stored material along with environmentally acceptable releasable gases.

The foregoing and other objects, features and advantages of the present invention will become apparent upon considering the following detailed description of preferred embodiments thereof, particularly when viewed in connection with the accompanying drawings wherein like reference numerals in various figures are used to designate like components.

DESCRIPTION OF THE PREFERRED EMBODIMENTS

Figure 1:
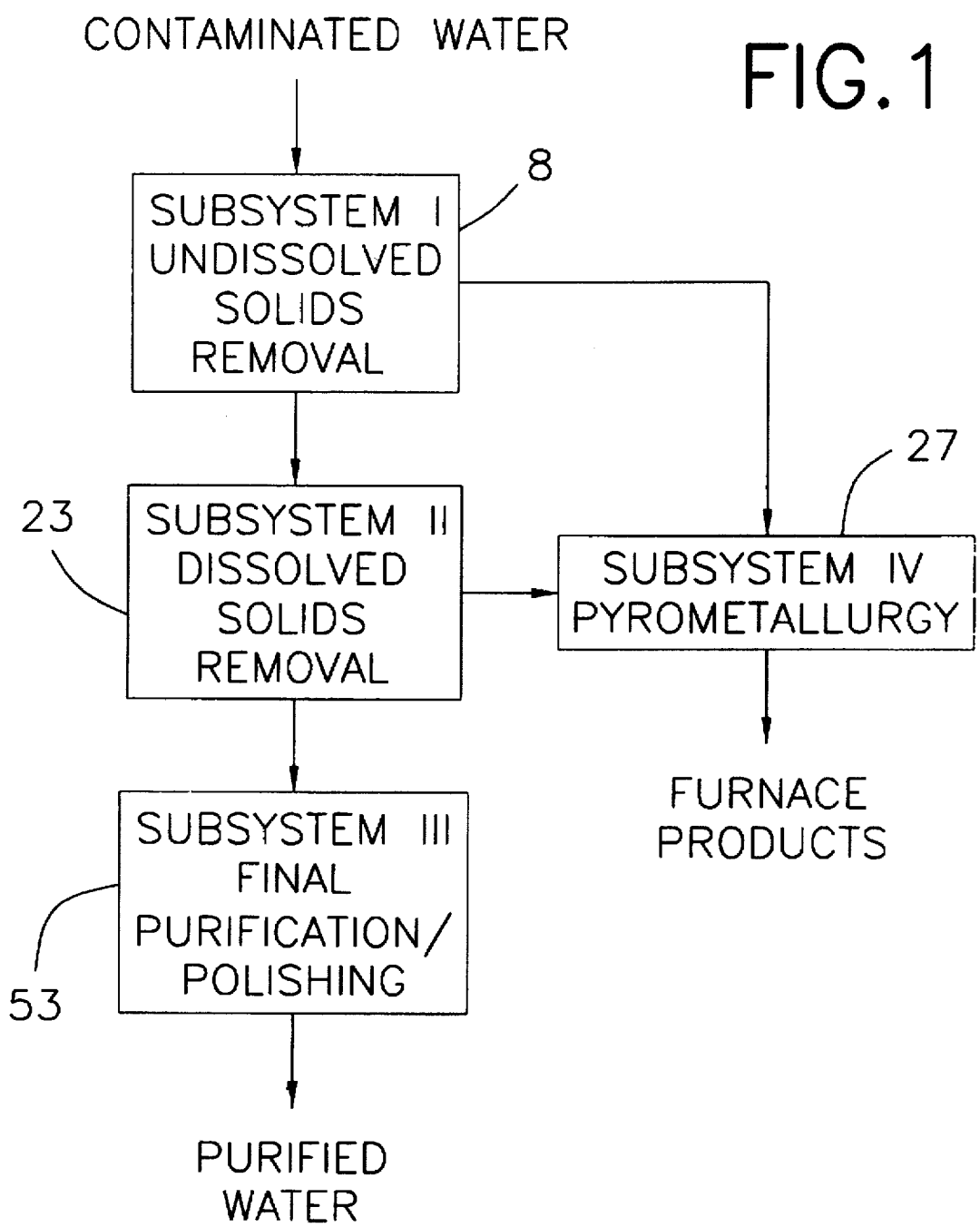
FIG. 1 is a flowchart of the Subsystem processes interaction according to the present invention.
Figure 2:
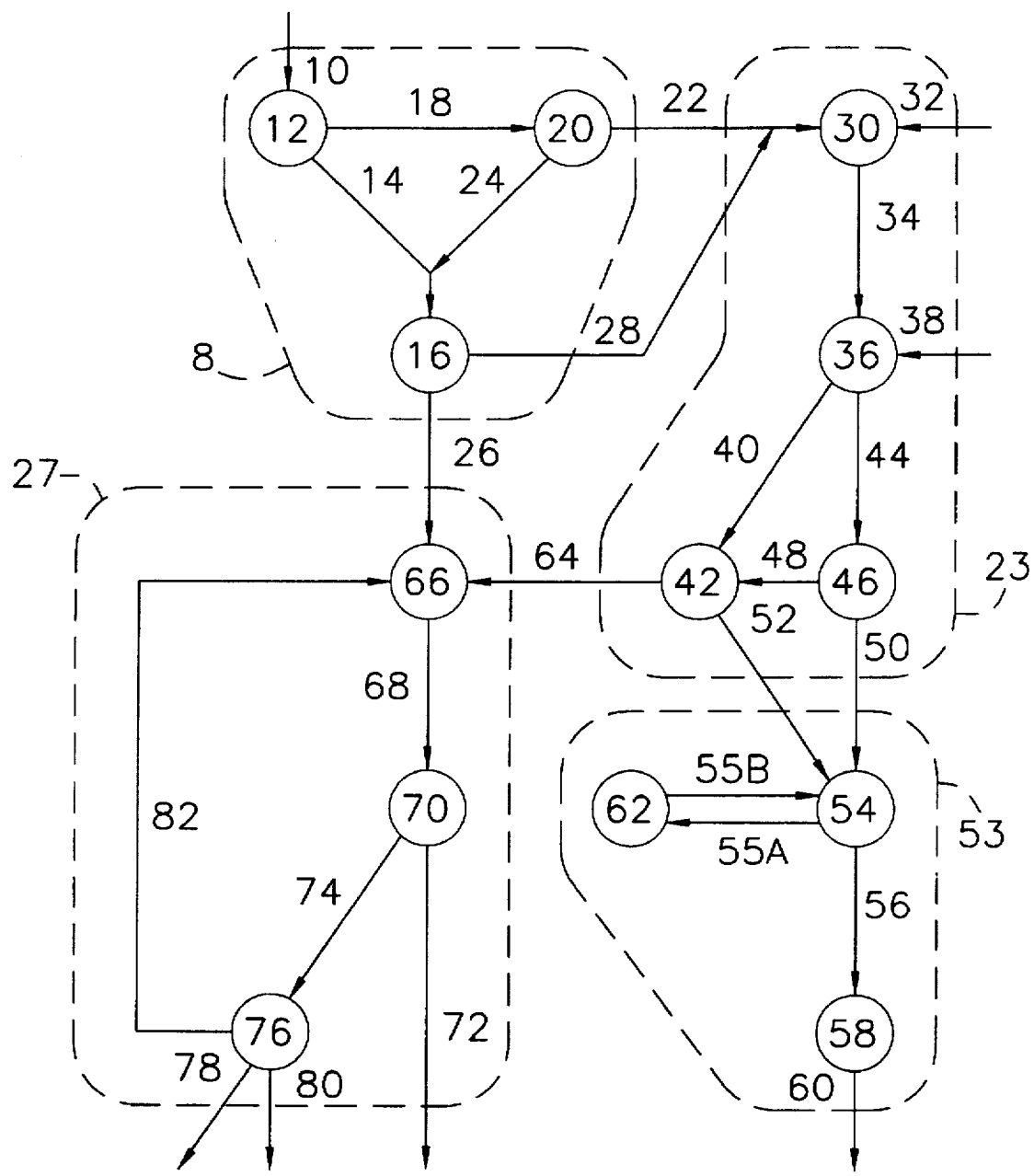
FIG. 2 is a flowchart of steps in purifying water contaminated with non-radioactive materials according to the present invention.
Figure 3:
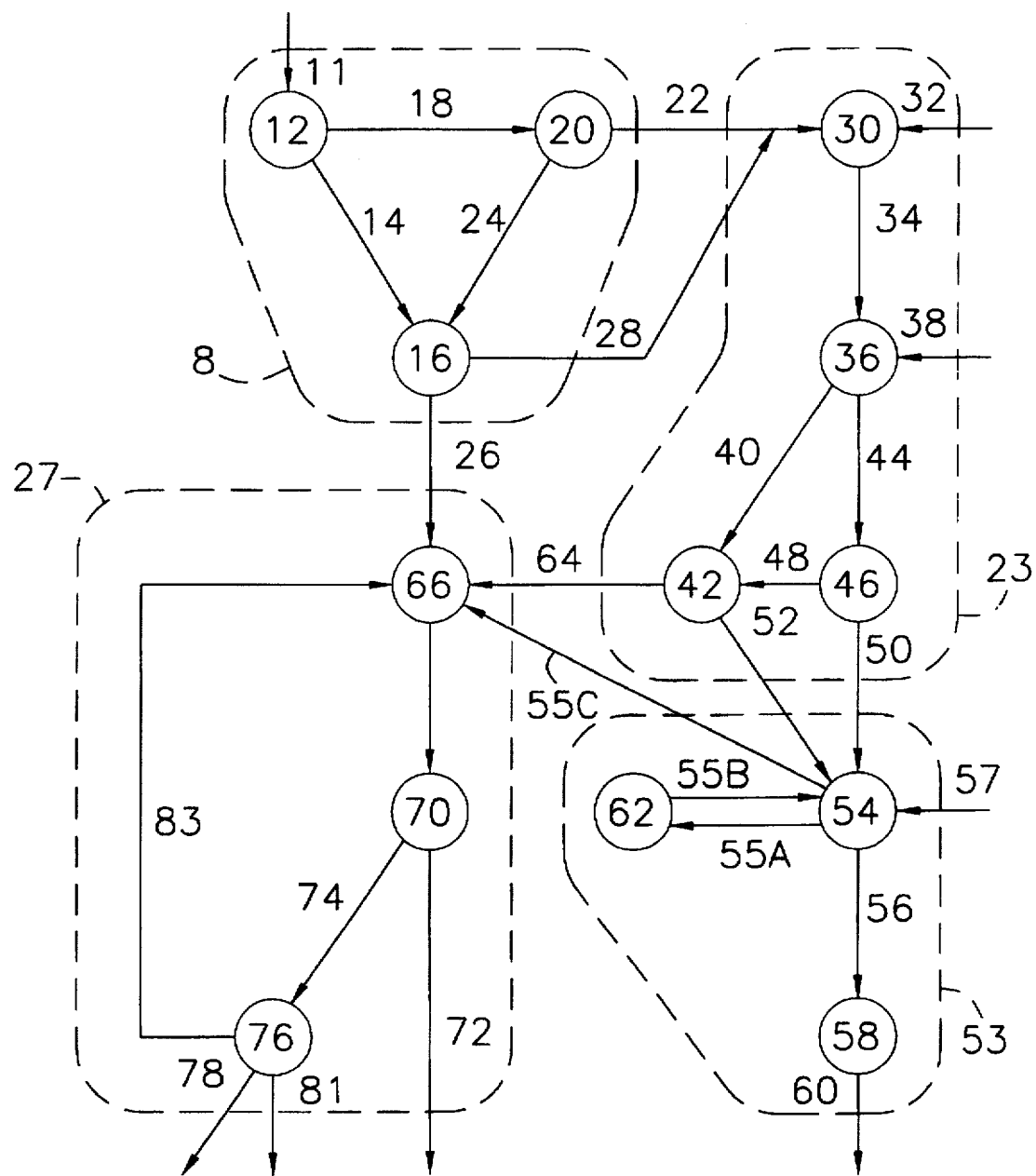
FIG. 3 is a flowchart of steps in purifying water contaminated with radioactive materials according to the present invention.

Water purification requires the removal of undissolved solids, dissolved solids and organic compounds. The general sequential procedure for achieving such purification according to the present invention is shown in FIGS. 1–3. The process of the present invention contains four basic subsystems for purification as displayed in FIG. 1. Subsystem I, 8, accomplishes the removal of undissolved solids from the initial contaminated water stream. Subsystem II, 23, precipitates and removes dissolved solids from the effluent of Subsystem I. Subsystem III, 53, further reduces dissolved solid content from the effluent of Subsystem II through a polishing process and removes organic compounds. Subsystem IV, 27, processes the collected solids from both Subsystems I and II into decontaminated inert material for storage or recycling and clean gas.

FIG. 2 displays one embodiment of the invention featuring the processing of water contaminated by only non-radioactive materials. Subsystem I 8 combines solids separation and filtration steps to remove undissolved solid matter. Non-radioactive contaminated water 10 is first introduced into a settling tank 12. It should be noted that a number of alternative means to the use of a settling tank 12 can be substituted, including gravity filters, clarifier mechanisms and pressure filters. Flocculants could also be introduced at this point to form filterable agglomerations of undissolved solids. The heavier, more concentrated solids pass through stream 14, together with a small portion of water, and are drawn from the bottom of the settling tank 12 to flow into a first solids concentrator 16. The remaining overflow water 18 from the settling tank 12, still containing fine, entrained solid matter, flows through a first conventional microfiltration unit 20 with the filtered output water stream 22 directed into Subsystem II 23. An aqueous solution of microfiltered materials 24 also exiting the microfiltration unit 20 is combined with stream 14 containing the settling vessel solids, to enter a first concentrator 16 where further dewatering is accomplished by conventional means, such as centrifuging. The separated solids from the first concentrator 16 pass through stream 26 and are fed to Subsystem IV 27 for processing, discussed hereinafter. The separated or clarified water flows from the first concentrator 16 through stream 28 and combines with the filtered output stream 22 produced by the first microfiltration unit 20.

The merged stream 22, or effluent, from Subsystem I 8, substantially devoid of undissolved solids but still containing dissolved matter, is directed into one or a series of precipitators 30 involving the conventional addition of reagents and/or pH adjustment materials via stream 32 to initiate precipitation, depending on and varying with the nature of the dissolved matter. Precipitation of metallic ions resulting from the formation of metal hydroxide, is influenced by the pH condition of the water. Hence pH adjustment and regulating reagents are added to optimize precipitation for the dissolved materials of interest. The precipitated effluent exits the precipitator 30 and flows via stream 34 into a flocculation and settling tank 36.

The flocculation process in the flocculation and settling unit 36 is initiated by the addition of a stream 38 containing standard commercial flocculants. Granular additives called High-Density Inorganic Adsorbents (HDIA) are also added to initiate Hydroxyl-Ion Facilitated Ionic Capture (HIFIC), and to cause small precipitated particles to combine forming agglomerates sufficiently large for practical filtration. Prior art water filtration techniques have generally employed natural and synthetic zeolites, such as aluminum silicates, which effect ionic capture of dissolved metal cations. In the present invention a more dense iron-rich HDIA compound previously available as ECOSORB from Horsehead Resource Development, Inc. of Palmerton, Pa., and now marketed as FE40* by Environmental Management Associates of Trucksville, Pa. is used to surprising effect.

This material, added in powdered or granular form, exhibits the characteristic of raising the pH value of host water to levels higher than those associated with maximum precipitation of metal hydroxide contaminants. As a result, those particles of metal hydroxides sufficiently small to elude practical flocculation are forced again into solution, where extraction is effected by ionic capture.

The FE40*, material has a median pore size of four microns. Some are smaller. Some are larger. Particles that are smaller than those pores become trapped placing them in close proximity to the capture-surface of the material. Each particle of FE40*, performs the inherent function of pH modification. The pH within each particle is 10.0, or higher. This provides a very strong driving force for most metal hydroxides to go into solution and to be subsequently captured by FE40*. The net effect is that a greater metal removal is achieved during flocculation than can be achieved by the flocculating agent alone.

A unique feature of FE40* comes into play when it is applied in this fashion. Using the material in this way makes limited numbers of capture locations available to a large number of metal candidates. This results in a strong competition amongst the metals present in the solution for those capture sites, in turn initiating a selection process within FE40*. The FE40*, can therefore be used to target a given metal independent of the other metals present in the solution.

If the metal which has been captured during this flocculation process has a need to be separated from subsequent steps in the process, this is readily accomplished by taking advantage of the magnetic properties of FE40*. FE40*, can be recovered with 98% efficiency. This property allows the material to be managed in a flowing system by the selective application of a magnetic field, or a series of magnetic fields, offering new possibilities for solutions containing precious metal, or radioactivity, or a metal of high toxicity such as mercury.

The iron-rich material FE40*, is produced in a reducing atmosphere Waelz Kiln as a coproduct of the processing of Electric Arc Furnace (EAF) dust, rich in iron, zinc, lead and cadmium. The general physical and chemical characteristics of the FE40*, material are shown in Tables 1 and 2, respectively, below.

TABLE 1

| Representative Physical Properties of FE40* | |
| --- | --- |
| Surface Area | 9.7 m2/g |
| Pore Volume | 25% |
| Median Pore Size | 4μ |
| Void Volume | 41.2% |
| Bulk Density | 1.49 g/cc |

TABLE 2

| Representative Composition of FE40* | |
| --- | --- |
| Element | Weight % |
| Fe | 28.2 |
| Ca | 10.7 |
| Mg | 2.6 |
| Si | 8.4 |
| Zn | 4.2 |
| Mn | 3.6 |
| Al | 3.6 |
| Pb | 0.18 |
| Cu | 0.62 |
| Ni | 0.12 |
| Ti | 0.17 |
| Cr | 0.31 |
| Na | 0.55 |
| K | 0.31 |

The values shown in the tables are approximate and representative of typical reducing atmosphere Waelz Kiln iron-rich material (IRM) output, however variations in EAF input materials and processing produce a range chemical proportions. The material supports the precipitation process by releasing hydroxyl ions to very slowly neutralize acidity and thus produce and maintain an elevated pH level.

Precipitates exit the flocculation and settling tank 36 via stream 40 and are transferred to a second solids concentrator 42. The remaining water effluent passes via stream 44 from tank 36 to a second conventional microfiltration unit 46 for treatment to remove remaining flocculants and settled matter. The filtered material exiting the second microfiltration unit 46 via stream 48 is passed to and processed through second solids concentrator 42 along with the previously separated precipitate stream 40.

This Subsystem II effluent, largely cleansed of dissolved material is directed via streams 50, 52 into Subsystem III 53 to undergo a polishing procedure in which the water is passed through a clear well extraction vessel 54 comprising a series of unique microporous inorganic filter media (MIFM) beds which selectively adsorbs metal cations from the solution to effect final removal of dissolved inorganic contaminants. This polishing step once again takes advantage of the unique properties of the compound FE40*, combined with a clear-well, bottom fed filter configuration as will be described in detail hereinafter.

The cleansed water exiting this polishing step via stream 56 is then optionally passed through an activated carbon filter 58 to remove organic compounds, and finally the filtered clean water is then safely discharged back into the environment via stream 60. Of note, it has been found that the FE40 * material used in both Subsystem II and III possesses the pathogenic characteristic of killing or inhibiting the growth of biological organisms such as E-coli, and although not a substitute for subsequent activated carbon filtration, such biologic action provides a system enhancement. The spent adsorbents used in the MIFM beds in vessel 54 are transferred via line 55A to a high temperature metal recovery facility 62 for rejuvenation and recycled via line 55B into the polishing procedure in vessel 54.

Subsystem IV 27 receives the separated undissolved solids via stream 26 removed by Subsystem I 8 and processed through the first solids concentrator 16 and a precipitate stream 64 from Subsystem II 23 processed through the second solids concentrator 42. These solid materials passing through streams 26 and 64 are transferred into a solids preparation unit 66 for drying and the output stream 68 is subsequently channeled into an electric metallurgical furnace 70 for pyrometallurgical conversion into neutral metals and slags exiting via stream 72. The electric metallurgical furnace 70 can be of any appropriate conventional type including resistance, induction and both AC and DC electric arc designs, governed by the input material properties and desired output characteristics. The gaseous by-products exit the furnace 70 via stream 74 to pass through a cleansing unit 76 comprising a series of conventional cleansing devices, for instance particulate collection, gas washing and filtration units, to render a gas stream 78 free of contaminants, and environmentally inert for unrestricted atmospheric release. The remaining by-products and flue dust exiting the cleansing unit 76 via stream 80 are finally either processed for regeneration separately or returned via line 82 for reprocessing through the Subsystem IV procedure into the solids preparation unit 66.

In another embodiment for the processing of a water stream 11 additionally contaminated by radioactive materials, modifications as illustrated in FIG. 3, are made in Subsystems III and IV. In particular, spent adsorbents passed from the polishing process 54, that are no longer susceptible to regeneration and recycling, are instead channeled via line 55C directly into Subsystem IV for drying and segregation in the solids preparation unit. Additional supplies of the adsorbent, in this case the FE40*, used in the clear well extraction vessel 54 may be continuously provided through channel 57.

The furnace output 72 consists of the radioactive materials encapsulated in amorphous slag in a process generally known as vitrification. The outputs of the gas washing and filtration units 76 are a gas stream 78 free of contaminants and a particulate stream containing flue dust and other byproducts which are either routed via stream 81 for processing and possibly regeneration in a subsequent procedure or returned via line 83 as input to Subsystem IV.

Figure 4:
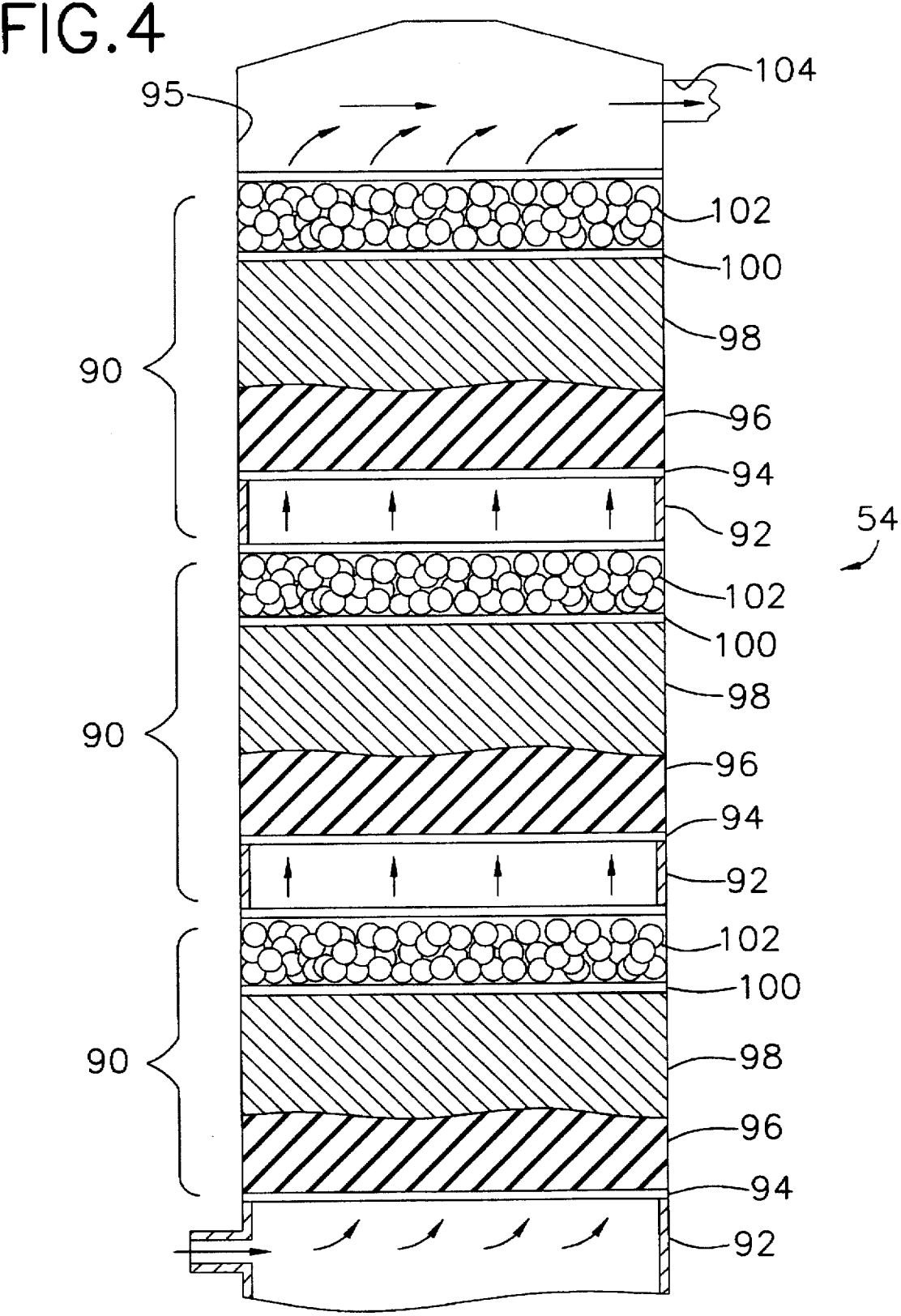
FIG. 4 is a view in cross-section of a clear well extraction vessel according to the present invention.

The clear-well bottom-fed filter extraction vessel 54 used in the polishing procedure of Subsystem III is shown in FIG. 4. In a preferred embodiment each extraction vessel 54 contains multiple filter stacks 90 each containing sequential layers of a peripheral support bushing 92, a perforated plate 94, crushed stone 96, FE40* adsorbent 98, an expanded metal disc 100 and stirring spheres 102, which, as viewed from the bottom up, are layered over the full cross-section of an open vessel.

Bushing 92 extends around the perimeter of vessel 54, supporting plate 94 and prevents the upwardly rising fluid from following streamlined or laminar flow along the vessel wall 95. Distribution plate 94, ¼ inch thick and preferably made of either 304 stainless steel or PVC 40 plastic, is cemented to the vessel perimeter and is covered by perforations not greater than ¼ inch in diameter. A layer of crushed stone 96 preferably sized at minus ½-inch plus ¼-inch rests atop plate 94 and is about two inches in depth to provide a bed for the finely grained material above. An adsorbent layer 98 of FE40*, adsorbent media preferably between four and eleven inches in depth rests atop the crushed stone and is covered by an adjacent expanded metal disc 100 fitted tightly against the vessel perimeter. A layer of stirring spheres 102, of the sort marketed as Tri-Paks by Jaeger Products, Inc. of Houston, Tex. is placed atop expanded metal disc 100 to a depth of at least two inches. The diameters of the stirring spheres, used to enhance the mixing and redistribution of the flow of rising fluid between successive adjacent filter stacks, can vary up to one or two inches. A retaining plate of expanded metal may optionally be used to constrain the buoyant stirring spheres or they may be allowed to rise to the underside of the distribution plate associated with the subsequent filter stack.

Three such filter stacks comprise one embodiment of a clear well extraction vessel according to the present invention, however the present invention envisions the use of one or more filter stacks to achieve varying degrees of separation. Subsystem II effluent is introduced into the open volume beneath the first (lowest) perforated distribution plate 94 and rises up through the various levels to be discharged through an outlet pipe 104 above the uppermost filter stack 90. The clear-well upward movement of the water through the filters provides two important advantages over conventional downward feed systems: residence time of the water within the extraction media can be more easily controlled; and inefficient short-path channeling of the water through the medium is avoided. The distribution plates provide support for each segment of the treatment bed and also provide additional management of the cross-sectional flow profile of the water being treated through the number and arrangement of the perforations. The value of such an entry is that the incoming water does not immediately encounter the treatment media, FE40 *, until the water has completely filled the cross-section of the vessel and is evenly distributed across the full area of the extraction bed. This positioning avoids the situation of top fed water having to distribute itself over the cross-section of the extraction body by a tortuous least resistive path through the voids of the treatment bed. Such labored distribution, when top fed, requires the water to move back and forth in the same area of the treatment bed subjecting the calcium compounds in the treatment media to a soaking action resulting in a deposit of those compounds accumulating on the bottom of the vessel. This deposition also occurs in the interstices of the treatment media and contributes to the solidification, and ultimate occlusion of the bed.

The polishing step is a cation capture that is facilitated by the infusion of hydroxyl ions by the FE40 * adsorbent media, the high-density inorganic adsorbent material described previously. The adsorption mechanics are along the typical lines of inclusion of ionic species into the molecular matrix of adsorbent materials. However, this is made to happen by interference with the formation process of metal hydroxides. FE40 * has the inherent ability to bring the pH of the solution containing the targeted metal to the optimum point for precipitation of its hydroxide. This infusion of hydroxyl ions can be sustained for great lengths of time thus holding the pH at the critical point even with the addition of incoming solution carrying a lower pH. In order for the target metal ion to form the hydroxide it must lose kinetic energy or movement in the solution. While this loss of energy enhances formation of the hydroxide, it also makes the metal-ion susceptible to the bonding forces of the metal matrix of the material itself. The bonding forces consistently prevail. The result is an ionic extraction of the metals from the solution in a manner typical of ion-exchange materials. Further, the metals removed can be selected by controlling the pH of the solution while it is in contact with FE40*. This control is obtained by regulating the residence time of the solution in contact with material. Processing rates are typically designed by using the flow rate in a ratio with the weight of contact bed.

The acknowledged rule for material in motion is that it will seek the path of least resistance. In packed columns, this is called channeling. It defeats the purpose of keeping the flowing material in contact with the bed as long as possible. By reversing the flow of the water from downward flow to upward, advantage is taken of the effect of gravity. Following the pull of gravity is made to be the path of least resistance within the system.

Flow into the extraction vessel is metered to control upward flow through the vessel and consequently to optimize the residence time of the flow in the extraction media. This control on the linear velocity also minimizes channeling both along the walls of the vessel (a favored path because of the smooth surface of the wall offering little resistance), and through the larger spaces in the body of the bed.

The bushing located beneath each perforated plate blocks the holes closest to the wall of the cylinder to reduce the tendency toward vessel wall channeling.

The repetition of the clear well segments further defeats channeling or short-circuiting of the flow of the water through the vessel by forcing the water to redistribute itself over the cross-section of the extraction bed between successive segments. This further maximizes the time spent by the water in contact with the extraction media. The stirring spheres provide mixing of the water as it is being redistributed over the cross-section of the extraction media and the open space following the stirring spheres forces turbulence to subside permitting entry into the next segment of the extraction bed as quietly as possible.

In view of the foregoing, it is apparent that the present invention presents a unique and efficient procedure for systematically purifying contaminated water to produce an environmentally benign effluent and at the same time to render the removed contaminants in a recoverable or safely storable form. The integration of iron-rich zeolite as both a pH adjusting aid to precipitation and as the adsorbent in a novel extraction vessel supports selective and sequential contaminant removal of both radioactive and non-radioactive materials.

While specific embodiments of the present invention have been shown and described, it will be obvious to those skilled in the art that changes and other modifications may be made without departing from this invention.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A process for purifying a stream of contaminated water comprising the steps of:
   (a) separating heavy undissolved solid matter from the stream of contaminated water;
   (b) flowing said heavy separated solid matter to a first concentrator for removing water;
   (c) flowing the water of step (a) through a microfiltration unit to remove fine entrained solid matter;
   (d) flowing said removed fine solid matter to said first concentrator for removing water;
   (e) flowing the water removed by said step (b) concentrator the water passing through said step (b) microfiltration unit and the water removed by said step (d) concentrator into a precipitator;
   (f) adjusting the pH level of the water in said step (e) precipitator by adding pH adjusting agents to initiate precipitation of dissolved solid matter;
   (g) flowing the pH adjusted water of step (f) into a flocculation and settling unit;
   (h) adding flocculents to the pH adjusted water of step (g) to initiate and assist flocculation;
   (i) adding high density inorganic adsorbent to the step (h) water to return unflocculated precipitate into solution for ionic capture;
   (j) flowing the ionically captured precipitate matter from step (i) to a second concentrator for further dewatering;
   (k) flowing the water of step (i) through a second microfiltration unit to remove fine entrained solid precipitated matter;
   (l) flowing the water passing through said step (j) concentrator and the water passing through said step (k) second microfiltration unit through an extraction vessel containing iron-rich microporous inorganic material having the physical characteristics shown in Table 1 and the chemical composition shown in Table 2 for polishing by metal cation adsorption; and
   (m) discharging the water passing through said step (1) extraction vessel as environmentally uncontaminated water.

2. The process for purifying contaminated water of claim 1 further comprising the steps of:
   (n) flowing said solid matter from steps (b), (d), (j) and (k) into a solids preparation unit having a dryer for drying said solid matter; and (o) flowing said dried solid matter of step (n) into an electric metallurgical furnace for pyrometallurgical conversion into neutral metals, slags and gaseous byproducts.

3. The process for purifying contaminated water of claim 1 wherein said high density inorganic adsorbent of step (i) is iron-rich microporous inorganic material having the physical characteristics shown in Table 1 and the chemical composition shown in Table 2.

4. The process for purifying contaminated water of claim 3 further comprising the step of cleaning and recycling said iron-rich microporous inorganic material used in said step (1) extraction vessel by treating said iron-rich mircroporous inorganic material in a high temperature metal recovery facility.

5. The process for purifying contaminated water of claim 4 wherein radioactively contaminated iron-rich microporous inorganic material is flowed into a solids preparation unit having a dryer for drying said material and subsequent pyrometallurgical conversion into encapsulated amorphous slag.

6. The process for purifying contaminated water of claim 3 wherein incremental amounts of said iron-rich microporous material in step (i) are added to incrementally capture ions of the most ionically active metal species present in the water.

7. The process for purifying contaminated water of claim 6 further comprising the step of separating said iron-rich microporous material and said captured metal ions from the water by selectively applying a magnetic field to the water.

8. The process for purifying contaminated water of claim 1 further comprising the step of:

(1.1) flowing the polished water of step (1) through an activated carbon filter to remove organic compounds.

9. A process for purifying contaminated water comprising the steps of:

(a) removing undissolved solid matter from said contaminated water by settling and micro filtration:

(b) removing dissolved solid matter from the water of step (a) by precipitation, flocculation, ionic capture and microfiltration;

(c) polishing the water of step (b) by flowing said step (b) water upward through a clear-well extraction vessel having at least one filter stack, each of said stacks having sequential layers of peripheral support bushing, perforated plate, crushed stone, iron-rich microporous adsorbent material, having the physical characteristics shown in Table 1 and the chemical composition shown in Table 2, an expanded metal disc and stirring spheres, each of said layers extending over the full cross-section of said vessel; and (d) discharging the polished water of step (c) back into the environment.

* * * * *